US008346961B2

(12) United States Patent
Asati et al.

(10) Patent No.: US 8,346,961 B2
(45) Date of Patent: Jan. 1, 2013

(54) SYSTEM AND METHOD FOR USING ROUTING PROTOCOL EXTENSIONS FOR IMPROVING SPOKE TO SPOKE COMMUNICATION IN A COMPUTER NETWORK

(75) Inventors: Rajiv Asati, Morrisville, NC (US);
Mohamed Khalid, Cary, NC (US);
Alvaro Enrique Retana, Raleigh, NC (US); Donnie Van Savage, Raleigh, NC (US); Pratima Pramod Sethi, Maharashtra (IN)

(73) Assignee: Cisco Technology, Inc., San Jose, CA (US)

( * ) Notice: Subject to any disclaimer, the term of this patent is extended or adjusted under 35 U.S.C. 154(b) by 468 days.

(21) Appl. No.: 11/954,831

(22) Filed: Dec. 12, 2007

(65) Prior Publication Data

US 2009/0157901 A1 Jun. 18, 2009

(51) Int. Cl.
*G06F 15/173* (2006.01)
(52) U.S. Cl. ........................................ 709/238; 709/230
(58) Field of Classification Search .................. 709/242, 709/238, 227, 230
See application file for complete search history.

(56) References Cited

U.S. PATENT DOCUMENTS

| 5,627,892 | A | 5/1997 | Kauffmann |
| 7,046,662 | B1 | 5/2006 | Saluja et al. |
| 7,184,437 | B1 * | 2/2007 | Cole et al. ..................... 370/392 |
| 7,234,063 | B1 | 6/2007 | Baugher et al. |
| 7,298,839 | B2 | 11/2007 | Eisentraeger et al. |
| 7,308,706 | B2 | 12/2007 | Markham et al. |
| 7,366,894 | B1 | 4/2008 | Kalimuthu et al. |
| 7,447,901 | B1 | 11/2008 | Sullenberger et al. |
| 7,486,795 | B2 | 2/2009 | Eschenauer et al. |
| 7,536,715 | B2 | 5/2009 | Markham |
| 7,558,877 | B1 | 7/2009 | Fedyk et al. |
| 7,594,262 | B2 | 9/2009 | Hanzlik et al. |
| 7,596,690 | B2 | 9/2009 | Singh |
| 7,602,737 | B2 * | 10/2009 | Asati et al. ..................... 370/255 |
| 7,657,036 | B2 | 2/2010 | Hsu et al. |
| 7,720,995 | B2 | 5/2010 | Wainner et al. |
| 7,801,030 | B1 * | 9/2010 | Aggarwal et al. ............. 370/228 |
| 7,840,810 | B2 | 11/2010 | Eastham |
| 7,848,335 | B1 | 12/2010 | Kang et al. |
| 7,957,320 | B2 | 6/2011 | Konig et al. |
| 2003/0126265 | A1 | 7/2003 | Aziz et al. |
| 2003/0191937 | A1 | 10/2003 | Balissat et al. |
| 2003/0211842 | A1 | 11/2003 | Kempf et al. |
| 2004/0103283 | A1 | 5/2004 | Hornak |

(Continued)

OTHER PUBLICATIONS

DMVPN [Online], Sep. 16, 2006, [Retrieved Sep. 2009], Cisco Systems, <http://web.archive.org/web/20060618050810/http://www.cisco.com/application/pdf/en/us/guest/netsol/ns130/c649/ccmigration_09186a0080685cc2.pdf>, pp. 1-101.*

(Continued)

*Primary Examiner* — Minh-Chau Nguyen
(74) *Attorney, Agent, or Firm* — Schwegman, Lundberg & Woessner, P.A.

(57) ABSTRACT

Systems and methods for using routing protocol extensions to improve spoke to spoke communication in a computer network are disclosed. Embodiments provide systems and methods to establish a tunnel between a first spoke and a hub, exchange routing information between the first spoke and the hub using a routing protocol, extend the routing protocol and an associated database to include next hop mapping information, and establish a tunnel between the first spoke and a second spoke according to information in the database.

14 Claims, 7 Drawing Sheets

U.S. PATENT DOCUMENTS

| | | | |
|---|---|---|---|
| 2005/0114663 | A1 | 5/2005 | Cornell et al. |
| 2006/0253556 | A1 | 11/2006 | Wallis et al. |
| 2006/0253703 | A1 | 11/2006 | Eronen et al. |
| 2007/0016663 | A1 | 1/2007 | Weis |
| 2007/0248225 | A1 | 10/2007 | Fluhrer |
| 2007/0271451 | A1 | 11/2007 | Fluhrer |
| 2008/0320303 | A1 | 12/2008 | Khalid et al. |
| 2009/0097417 | A1 | 4/2009 | Asati et al. |
| 2009/0304004 | A1* | 12/2009 | Huynh Van et al. ..... 370/395.31 |
| 2010/0223458 | A1 | 9/2010 | Mcgrew et al. |
| 2011/0013641 | A1 | 1/2011 | Kolhi et al. |

OTHER PUBLICATIONS

Luciani et al., RFC 2332 "NBMA Next Hop Resolution Protocol (NHRP)" [Online], Apr. 1998 [Retrieved Sep. 2009], Network Working Group, <http://tools.ietf.org/pdf/rfc2332.pdf>, pp. 1-53.*

Rekhter et al., "RFC 4271: A Border Gateway Protocol 4 (BGP-4)" [online], Jan. 2006 [retrieved Mar. 2010], IETF, <http://tools.ietf.org/html/rfc4271>, pp. 1-105.*

Configuring Dynamic Multipoint VPN Spoke Router in Full Mesh IPsec VPN Using Security Device Manager, White Paper, Cisco Systems, Inc., (2004), 26 pgs.

"U.S. Appl. No. 11/379,920, Response filed Sep. 29, 2010 to Non Final Office Action mailed Apr. 29, 2010", 14 pgs.

Frey, G., et al., "The Tate Pairing and the Discrete Logarithm Applied to Elliptic Curve Cryptosystems", [online]. Oct. 7, 1998. [retrieved on Sep. 29, 2010]. Retrieved from the Internet: <URL: www-rcf.usc.edu/~mdhuang/cs599/frey98tate.pdf>, 5 pgs.

Menezes, A., et al., "Diffie-Hellman Key Exchange", In: Handbook of Applied Cryptography, CRC Press LLC, (1997), 4 pgs.

U.S. Appl. No. 11/379,920, Notice of Allowance mailed Dec. 13, 2011, 11 pgs.

U.S. Appl. No. 11/871,508, Response filed Jan. 30, 2012 to Non Final Office Action mailed Sep. 29, 2011, 12 pgs.

* cited by examiner

Figure 1

```
                        Spoke 2
                         -120-

PE-Spoke-2#
   interface Tunnel1                                    ─ 310
    ip address 10.1.1.2 255.255.255.0
                                                       ╱ 320
   +    ip next-hop mapping 10.1.1.250 24.104.10.250
           tunnel source 24.104.10.2
           tunnel mode gre multipoint
           tunnel key 100
     tunnel protection ipsec profile mpls
   end
   PE-Spoke-2#
```

Figure 2

```
                              Spoke 1
                               -110-

PE-Spoke-1#sh ip bgp v v v11 192.168.2.0
BGP routing table entry for 11:1:192.168.2.0/30, version 106735
Paths: (2 available, best #2, table v11)
  Advertised to update-groups:
      1         2         3         4
   111 31 1999
     10.1.1.2 (metric 60) from 10.1.1.250 (10.1.1.250)
       Origin incomplete, metric 0, localpref 100, valid, internal
       Extended Community: RT:11:1
 +     Extended Community: Tunnel_Source_Address:24.104.10.2
       Originator: 10.1.1.2, Cluster list: 10.1.1.250
PE-Spoke-1#
```

Figure 3

```
                              Spoke 1
                               -110-

PE1#sh ip eigrp topology  192.168.2.0 255.255.255.252
  IP-EIGRP topology entry for 192.168.2.0/30
    State is Passive, Query origin flag is 1, 1 Successor(s), FD is 40537600
    Routing Descriptor Blocks:
    10.1.1.2 (Serial1/3:19), from 10.1.1.250, Send flag is 0x0
      Composite metric is (40537600/51200), Route is External
      Vector metric:
       Minimum bandwidth is 64 Kbit
       Total delay is 21000 microseconds
       Reliability is 255/255
       Load is 1/255
       Minimum MTU is 1500
       Hop count is 1
      External data:
       Originating router is 200.19.61.6
       AS number of route is 130
       External protocol is BGP, external metric is 0
       Administrator tag is 1300 (0x00000514)
       +        Extended Community: Tunnel_Source_Address:24.104.10.2

SYSTEM AND METHOD FOR USING ROUTING PROTOCOL EXTENSIONS FOR IMPROVING SPOKE TO SPOKE COMMUNICATION IN A COMPUTER NETWORK

CROSS-RELATED APPLICATIONS

This application is related to U.S. patent application Ser. No. 11/871,508, entitled "SYSTEM AND METHOD FOR IMPROVING SPOKE TO SPOKE COMMUNICATION IN A COMPUTER NETWORK", filed on Oct. 12, 2007, and assigned to Cisco Technology, Inc.

TECHNICAL FIELD

The disclosed subject matter relates to the field of computer network communications, and more particularly to systems and methods for using routing protocol extensions to improve spoke to spoke communication in a computer network.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2006-2007 Cisco Systems, Inc. All Rights Reserved.

BACKGROUND

A Virtual Private Network (VPN) is a logical network that uses non-secure public telecommunications, such as the Internet, to provide secure communications to members of the VPN. A VPN seeks to provide the security associated with dedicated communication lines but without requiring the requisite hardware and at a fraction of the cost, which is typically associated with dedicated communication lines.

A VPN works by using shared public infrastructure while simultaneously maintaining privacy through agreed upon security procedures and protocols. Essentially, a VPN uses custom encryption to encrypt messages communicated via the VPN. The encryption and decryption of messages rely upon keys that are securely held by participants of the VPN.

Dynamic Multipoint VPN (DMVPN) is an enhancement of the virtual private network configuration process of conventional network routers. DMVPN prevents the need for preconfigured (static) IPsec (IP security) peers in the network. IPsec is a standard for securing Internet Protocol (IP) communications by encrypting and/or authenticating all IP packets communicated among the network peers. IPsec provides security at the network layer. The DMVPN functionality of conventional network routers allows greater scalability over previous IPsec configurations. An IPsec tunnel between two conventional network routers may be created on an as-needed basis. Tunnels may be created between a spoke router and a hub router (VPN headend) or between spokes. This greatly alleviates the need for the hub to route data between spoke networks, as was common in a non-fully meshed frame relay topology.

In DMVPN, network traffic can traverse from one spoke to another. Initially, the network traffic is routed from a first spoke (e.g. spoke A) to the hub and then from the hub to a second spoke (e.g. spoke B). At the same time, DMVPN establishes a tunnel from spoke A to spoke B. Once the tunnel from spoke A to spoke B is created, traffic will be routed via the tunnel. Unfortunately, conventional DMVPN causes a significant reduction in the tunnel latency several seconds after the tunnel has been established. This sudden reduction in tunnel latency can cause problems in servicing delay-sensitive network traffic.

Thus, systems and methods for using routing protocol extensions to improve spoke to spoke communication in a computer network are needed.

DETAILED DESCRIPTION

In the following detailed description, reference is made to the accompanying drawings that form a part hereof, and in which are shown by way of illustration, specific embodiments in which the disclosed subject matter can be practiced. It is understood that other embodiments may be utilized and structural changes may be made without departing from the scope of the disclosed subject matter. The leading digit(s) of reference numbers appearing in the Figures generally corresponds to the Figure number in which that component is first introduced, such that the same reference number is used throughout to refer to an identical component that appears in multiple Figures. Signals and connections may be referred to by the same reference number or label, and the actual meaning will be clear from the use of these terms in the context of the description.

As described further below, according to various example embodiments of the disclosed subject matter described herein, there is provided systems and methods for using routing protocol extensions to improve spoke to spoke communication in a computer network.

A DMVPN spoke is typically configured with enough information, such as one or more IP addresses, to communicate with a hub. DMVPN hub IP addresses are typically static. DMVPN spoke IP addresses may be static or dynamic. An example would be a DMVPN spoke router acting as a DHCP (Dynamic Host Configuration Protocol) client on a DSL (digital subscriber loop) or cable provider's network. The spoke router is configured with the hub's IP address, allowing the spoke to connect with the hub when online. The hub router does not need to be configured with the IP addresses of the spoke routers. This allows many spoke VPN routers to be deployed without the need to configure additional peers on the hub(s). In the past, the configuration of the hub grew whenever a spoke VPN router was added to the IPsec network.

To avoid routing through the hub router for spoke-to-spoke traffic, NHRP (next hop resolution protocol) is often also used for spoke discovery. A key use of NHRP is for next hop resolution. A DMVPN spoke router may learn of the static or dynamic IP address of other spoke routers, using at least one routing protocol adjacency, and may resolve the corresponding next hops using NHRP. Additional IPsec tunnels are created as needed for spoke-to-spoke traffic. To conserve resources, these tunnels are torn down after they are no longer needed. Having spoke-to-spoke tunnels is a great benefit to delay-sensitive traffic, such as IP telephony and other real-time applications. The delay of the spoke router's progress through the hub to other spokes can be avoided after the latency incurred during the initial set-up. For redundancy, a spoke router can be mapped to one or more DMVPN hubs.

Particular embodiments described herein use Diffie-Hellman key generation as a cryptographic methodology. Such methodologies are well known to those of ordinary skill in the art. These methods can be used to generate an encryption/decryption key from a pair of values, one value being a public value and the other value of the pair being a private value. In the description that follows, these values are denoted as Diffie-Hellman (DH) public values or private values. These values can be generated for each spoke. It will be apparent to those of ordinary skill in the art that other equivalent cryptographic methodologies may also be employed.

Internet Key Exchange (IKE) uses a Diffie-Hellman key exchange to set up a shared session secret, from which cryptographic keys are derived. Public key techniques or, alternatively, a pre-shared key, are used to mutually authenticate the communicating parties.

Using DMVPN, router resources are only claimed when needed. However, this may introduce variable forwarding delays during the time in which resources are being claimed. In these configurations, the spoke typically acts as a NHRP client (NHC) and the hub acts as the NHRP server (NHS). The use of NHRP introduces latency into the routing. Some DMVPN implementations mandate the use of NHRP to resolve the next hop. As part of the next hop resolution, address mappings (e.g., mappings from a first address to a second address) are maintained at the spokes and hubs. In particular, NHRP mapping information maintained at the spokes may include physical and tunnel addresses of the hub and adjacent spokes. NHRP mapping information maintained at the hub may include physical and tunnel addresses of the adjacent spokes. In addition to NHRP adjacency information, each spoke may maintain a routing protocol adjacency with each hub to exchange the routing information to help with any-to-any connectivity.

Figure 1:
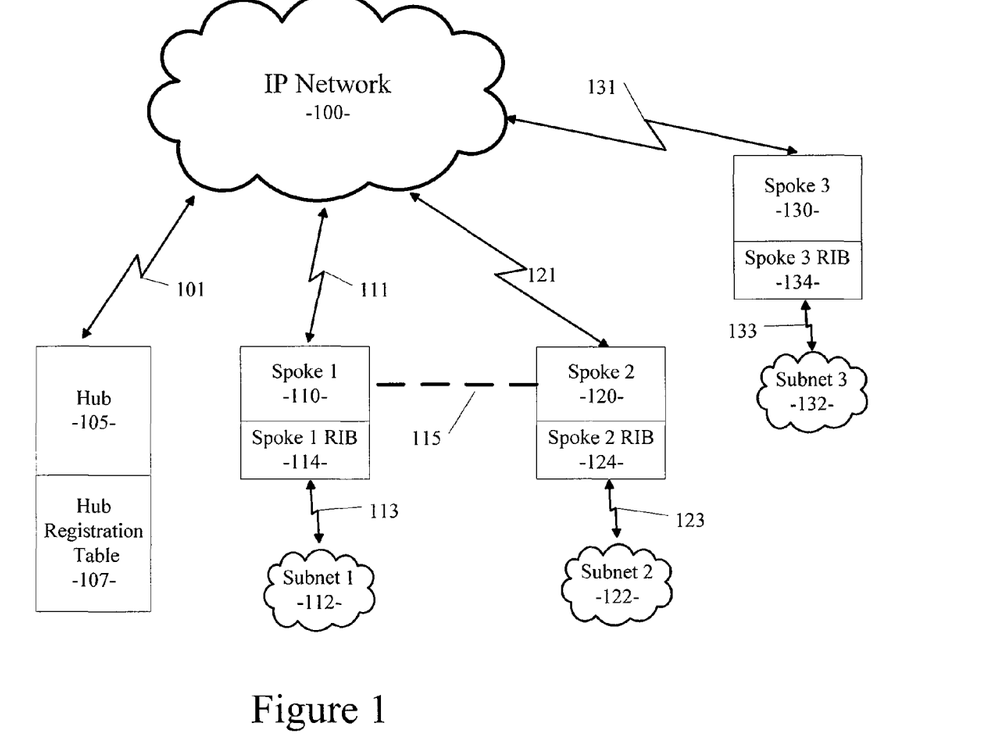
FIG. 1 illustrates the typical network environment of various embodiments.

Referring to FIG. 1, the typical network environment of various embodiments is illustrated. As shown, a hub 105 is logically connected to three example spokes 110, 120, and 130 through an Internet Protocol (IP) network 100, such as the Internet. The hub 105 and spokes 110, 120, and 130 can be implemented as network routers, hubs, or gateways. The hub 105 device, in a classic DMVPN network, usually also serves as the NHRP server and routing protocol server. Spokes 110, 120, and 130 can be gateways that each control access to a corresponding subnet 112, 122, and 132, respectively. The subnets or other nodes connected through the subnets can represent the destination for a particular data packet. It will be apparent to those of ordinary skill in the art that many other gateways (generally denoted herein as spokes) and subnets will be interconnected in a typical network configuration. Additionally, well-known network routing and data transfer protocols can be used to transfer data between the hub and the spokes and between the spokes themselves via the network 100. The hub and the spokes are generally referred to herein as nodes or network nodes. In the manner described in more detail below, protected data communication between spokes can be accomplished via the unprotected IP network 100 without incurring the latency common in conventional systems.

In accordance with the various embodiments described herein, each spoke 110, 120, and 130 can initially register itself with hub 105 using NHRP. When a spoke registers with the hub 105 using NHRP, the spoke can register its IP address, and next hop mapping information. The hub 105 can store the spoke registration information in a hub registration table 107 (also denoted NHRP table) or an associated database. Hub 105 thereby updates the hub registration table 107 or an associated database.

As described herein in reference to example embodiments, an improved DMVPN framework without the use of NHRP is disclosed. In various embodiments described herein, the functionality previously provided by NHRP (or a subset thereof) is incorporated into a routing protocol by creation of an extended routing protocol. It will be apparent to those of ordinary skill in the art that many well-known routing protocols can be similarly extended for use with the techniques described herein. As described in more detail below, routing protocol extensions are provided to enable the encoding of next hop information pertinent to the prefix reachability information and the related state machine changes.

In accordance with various embodiments, the routing protocols, which are capable of conveying extended communities, are enhanced to carry a next hop address in the extended community with each route or group of routes. Hence, when the spoke router receives a route advertisement via the routing protocol along with the relevant extended community values, the spoke immediately knows the private-to-public address mapping and appropriately installs the forwarding entry. In two example embodiments described below, two particular routing protocols, EIGRP and BGP, are used to illustrate the inventive techniques.

EIGRP is a routing protocol developed by Cisco Systems, Inc. EIGRP is loosely based on an original Interior Gateway Routing Protocol (IGRP). EIGRP is an advanced distance-vector routing protocol, with optimizations to minimize both the routing instability incurred after topology changes, as well as the use of bandwidth and processing power in the router. EIGRP is used extensively in enterprise networks.

BGP is a core routing protocol of the Internet. BGP works by maintaining a table of IP networks or 'prefixes' which designate network reachability among autonomous systems (AS). It is described as a path vector protocol. BGP does not use traditional Interior Gateway Protocol (IGP) metrics, but makes routing decisions based on path, network policies, and/or rule sets.

In the well-known DMVPN architecture, the next hop of a destination prefix is not resolved by the spoke router until the spoke router starts receiving interesting message traffic for the destination prefix. Until the next-hop is resolved, the traffic path remains as spoke1→hub→spoke2. After the next-hop is resolved, the traffic path changes to a more efficient configuration of spoke1→spoke2 as shown in FIG. 1. The next-hop resolution is typically performed using NHRP, which runs between each spoke and hub such that the spoke acts as the NHC and hub acts as the NHS.

Moreover, until the Next-hop is resolved, a spoke1 will have to forward a data packet (destined towards another spoke) to the hub, which decrypts the packet, decapsulates the Generic Routing Encapsulation (GRE) header, performs the IP lookup, then encrypts the packet, encapsulates the GRE header, and then forwards the packet to the appropriate remote spoke. It is clear that such spoke→hub→spoke traffic path results in the unwanted delay/jitter overhead and puts additional forwarding overhead on the hub router.

The DMVPN architecture can be combined with a well-known Multi-Protocol Label Switching (MPLS) Virtual Private Network (VPN) to provide the benefit of a segmented/departmental VPN. MPLS is well suited to the task as it provides traffic isolation and differentiation without substantial overhead. In a MPLS/VPN implementation, Multi-Protocol BGP (MP-BGP) is overlaid on top of the DMVPN network to exchange the VPN routing information among the spoke routers. Such an overlay model results in the usage of the following three protocols within the network, which then becomes unnecessarily complex from the design/deployment standpoint: NHRP, MP-BGP, and IPSec.

Because IP routing protocols such as BGP, EIGRP, etc. are almost always used in DMVPN networks, and are capable of carrying useful extensions, it is more efficient to utilize a routing protocol, instead of NHRP, to carry the next hop mapping and to be able to resolve the next-hop of a prefix as soon as the prefix is learned via the routing protocol.

DMVPN utilizes a Multi-point Generic Routing Encapsulation (mGRE) tunnel to tunnel the traffic through the underlying IP/MPLS cloud. The mGRE tunnel also provides the conduit for the IPSec encryption (tunnel mode), if cryptography is desired. The mGRE tunnel's IP address could be an IP address that is not known within the IP/MPLS cloud. One example of such IP address is a private IP address (e.g. 10.0.0.0/8). Additionally, the mGRE tunnel is configured with a routable IP address as the 'tunnel source'. This routable IP address must be known within the IP/MPLS network cloud.

In an example BGP implementation, at a high level, each DMVPN spoke router (that may also be the PE router) can form the BGP session either with every spoke router (, i.e. full-mesh), or only with the Route-reflector (RR) to exchange the IP and/or VPN routing information. The RR functionality can be implemented at the hub. Considering the BGP RR model as a favored model in some deployments, the rest of the application considers the hub router to be enabled with the BGP RR functionality. In either case, the next-hop of such routes can be the "tunnel IP address," which could even be a private IP address.

To accomplish this beneficial embodiment, BGP is enhanced to carry the NEXT_HOP NBMA (non-broadcast multiple access network) address in the BGP extended community with each route. Hence, when the spoke router receives the BGP advertisement (carrying IP and/or VPN routing information), the spoke router immediately knows the private-to-public address mapping and appropriately installs the forwarding entry (using the NBMA address for the GRE delivery header). The various embodiments described herein are independent of whether a peer-to-peer or Common Group key mechanism is used for the IPSec Security Associations (SA) exchange.

The various example embodiments described herein can use BGP and its attributes. In fact, one example embodiment favors the BGP session to be set up using the GRE tunnel address as the neighbor address and be optionally secured via the cryptography.

It is possible to have the BGP session set up outside the tunnel (e.g. using the physical interface address that is routable). However in this embodiment, the BGP session won't necessarily be secured via cryptography because cryptography (such as IPSec) protection is activated only on the tunnel within DMVPN.

Because NHRP is no longer needed or used in the various example embodiments using the DMVPN architecture described herein, each spoke can be configured with information for resolving the reachability to the hub, the hub also serving as the Routing hub (i.e. BGP RR). Once the BGP session between the RR and spoke gets established, the spoke can advertise and receive the BGP routes along with the provided extended community, and retrieve the relevant NBMA addresses from the extended community of the received BGP routes.

It is important that the spoke is able to communicate with the hub prior to (and in order to) establish the routing protocol session between the hub and spoke. Hence, the spoke is provided with next hop mapping information related to the hub either implicitly or explicitly. In one embodiment, the next hop mapping information (containing the mapping of the hub's tunnel IP address with the hub's tunnel source address) can be provisioned on the GRE tunnel at the spoke. This will result in the appropriate outer GRE header being built. In a particular example embodiment, the GRE delivery header will have the following data objects:

Source IP address=spoke's tunnel_source_address
    Destination IP address=hub's tunnel_source_address
    whereas the encapsulated packet will have—
    Source IP address=spoke's tunnel address
    Destination IP address=hub's tunnel address Because the spoke is provided with the ability to communicate with the hub in the particular embodiment described above, the routing protocol can be used to initiate the routing protocol session established between the hub and spoke via a spoke interface. The initial routing protocol message (OPEN message in BGP, or Hello message in EIGRP) sent by the spoke router can also carry the spoke's next hop mapping information. This enables the hub to discover the spoke's NBMA address. The hub can then store this information in the related database.

Also note that if the GRE tunnel is secured with any cryptography technique (such as peer-to-peer or Group_Key IPSec), then the cryptography session should be established between the spoke/PE and the hub before the BGP session can be established between them; this way, the BGP session would also be protected.

Figure 2:
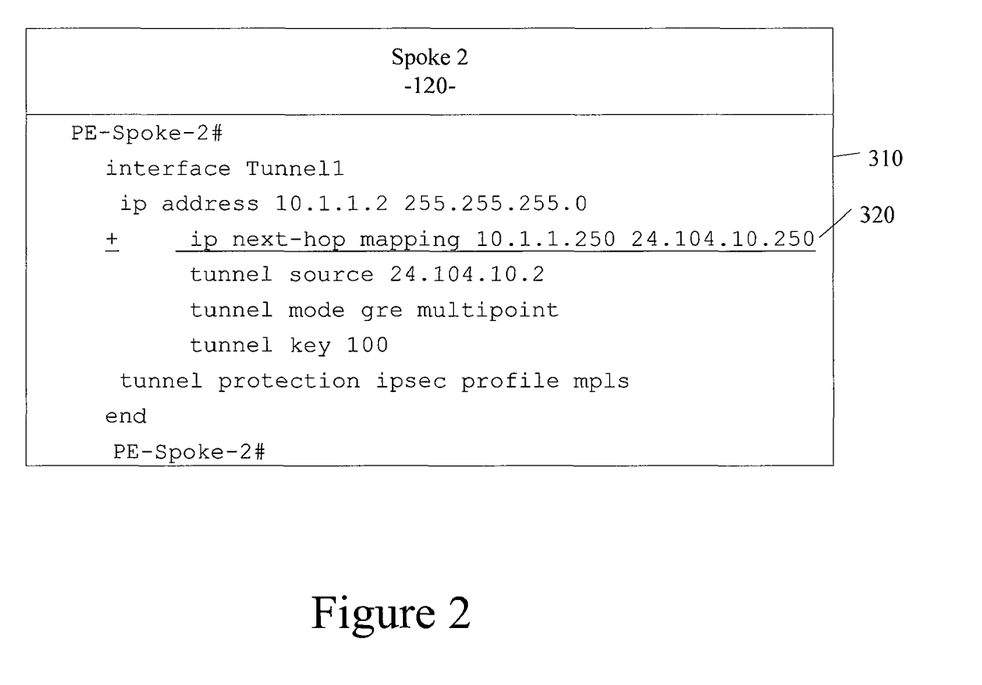
FIG. 2 illustrates an example embodiment of the spoke tunnel configuration data including information for resolving the reachability to the Border Gateway Protocol (BGP) Route-Reflector (RR).

Referring to FIG. 2, an example embodiment of the spoke tunnel configuration data 310 including information for resolving the reachability to the hub is illustrated. In this example, the next hop mapping information 320 is included in the spoke's tunnel configuration data 310. In this example, the hub's tunnel address is 10.1.1.250, whereas its tunnel-source-address is 24.104.10.250 (see next hop mapping information 320). Although the example embodiment shown utilizes a static mapping configuration, it is possible to inject this information dynamically into the spoke tunnel configuration data 310.

Each spoke/PE router forms a BGP session with the RR to exchange the IP and/or VPN routing information. The BGP RR reflects, i.e. advertises, any received routes to each spoke/PE router without changing the next-hop attribute.

At the advertising spoke/PE router, BGP encodes the tunnel's source address (i.e. a routable public address) within the extended community for each IP/VPN prefix.

At the receiving spoke/PE router, BGP may install the IP/VPN best path in the Routing table (RIB) 124 (as shown in FIG. 1) with the next-hop value as set by the remote spoke using its tunnel's address as usual. Additionally, BGP can provide the information regarding the routable public address extracted from the associated External Community (Extcomm) and store the information in the form of a mapping in another database.

The forwarding table (FIB) may retrieve this public<->private address mapping information from the database and use the mapping and next-hop information to appropriately populate the forwarding entry for that prefix with the updated next-hop.

Figure 3:
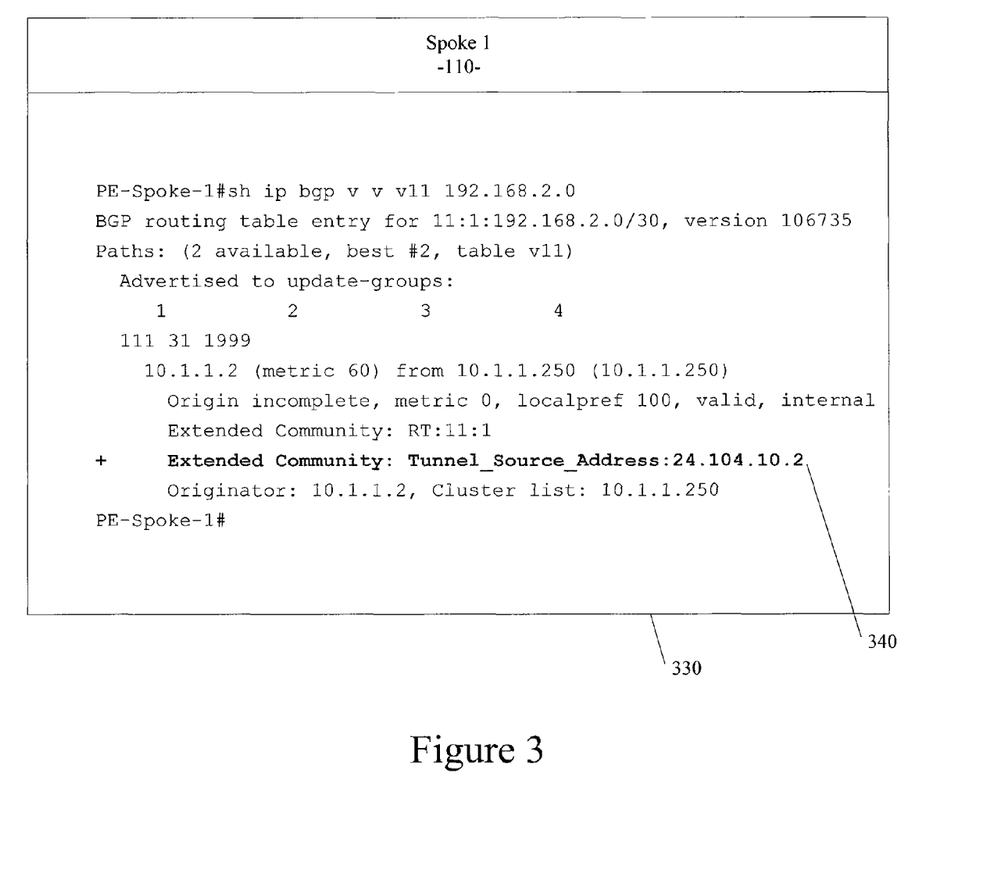
FIG. 3 illustrates an example embodiment of the Show BGP Command output including an example forwarding entry.

Referring to FIG. 3, an example embodiment of the Show BGP Command output 330 including an example forwarding entry 340 is illustrated. In this example, the PE-spoke-1 uses the forwarding entry 340 to learn a VPN route advertised by PE-spoke-2, whose tunnel address is 10.1.1.2 and whose tunnel-source-address is 24.104.10.2 (see forwarding entry 340).

In an example EIGRP implementation, at a high level, each spoke router (that may also be the PE router) can establish an EIGRP peering session with the DMVPN hub router to exchange the routing information. The next-hop of such routes would be the tunnel IP address, which is likely to be a private IP address. The routing protocol update originated by a spoke router can reach another spoke via the hub router, without having its content changed.

To accomplish this beneficial embodiment, the DMVPN architecture is enhanced such that the spoke router can resolve the NEXT_HOP's without needing NHRP. The various embodiments described herein are independent of whether a peer-to-peer or Common Group key mechanism is used for the IPSec SA exchange.

In the example EIGRP implementation as in the BGP implementation described above, it is important that the spoke is able to communicate with the hub prior to (and in order to) establish the routing protocol session between the hub and the spoke. Hence, the spoke is provided with next hop mapping information related to the hub either implicitly or explicitly. In one embodiment, the next hop mapping information (containing the mapping of the hub's tunnel IP address with the hub's tunnel source address) can be provisioned on the GRE tunnel at the spoke. This will help the spoke router to appropriately build the outer GRE header and to forward the packet to the hub router. In a particular example embodiment, the GRE delivery header will have the following data objects:

Source IP address=spoke's tunnel_source_address
Destination IP address=hub's tunnel_source_address
whereas the encapsulated packet will have—
Source IP address=spoke's tunnel address
Destination IP address=hub's tunnel address Because the spoke is provided with the ability to communicate with the hub in the particular embodiment described above, the routing protocol can be used to initiate the routing protocol session established between the hub and spoke. The initial routing protocol message (OPEN message in BGP, or Hello message in EIGRP) sent by the spoke router can also carry the spoke's next-hop mapping information. This enables the hub to discover the spoke's NBMA address. The hub can then store this information in the related database.

Referring again to FIG. 2, an example embodiment of the spoke tunnel configuration data 310, including information for resolving the reachability to the hub, is illustrated. In this example, the next hop mapping information 320 is included in the spoke's tunnel configuration data 310. In this example, the hub's tunnel address is 10.1.1.250, whereas the hub's tunnel-source-address is 24.104.10.250 (see next hop mapping information 320). The spoke's (PE-spoke-2) tunnel address is 10.1.1.2, whereas the spoke's (PE-spoke-2) tunnel-source-address is 24.104.10.2. Although the example embodiment shown utilizes a static mapping configuration, it is possible to inject this information dynamically into the spoke tunnel configuration data 310.

Each spoke router forms an EIGRP session with each hub router to exchange the IP routing information. The EIGRP session, as usual, utilizes the tunnel IP address for all practical purposes.

At the advertising spoke router, EIGRP encodes the tunnel's source address (i.e. a routable public address) within the extended community for each IP prefix.

At the Receiving spoke router, EIGRP may install the IP best path in the Routing table (RIB) 124 (as shown in FIG. 1) with the next-hop set to the tunnel's private address as usual. Additionally, EIGRP can provide the information regarding the routable public address extracted from the associated External Community (Extcomm) and store the information in the form of a mapping in another database.

The forwarding table (FIB) may retrieve this public<->private address mapping information from the database and use the mapping and next-hop information to appropriately populate the forwarding entry for that prefix with the updated next-hop.

Figure 4:
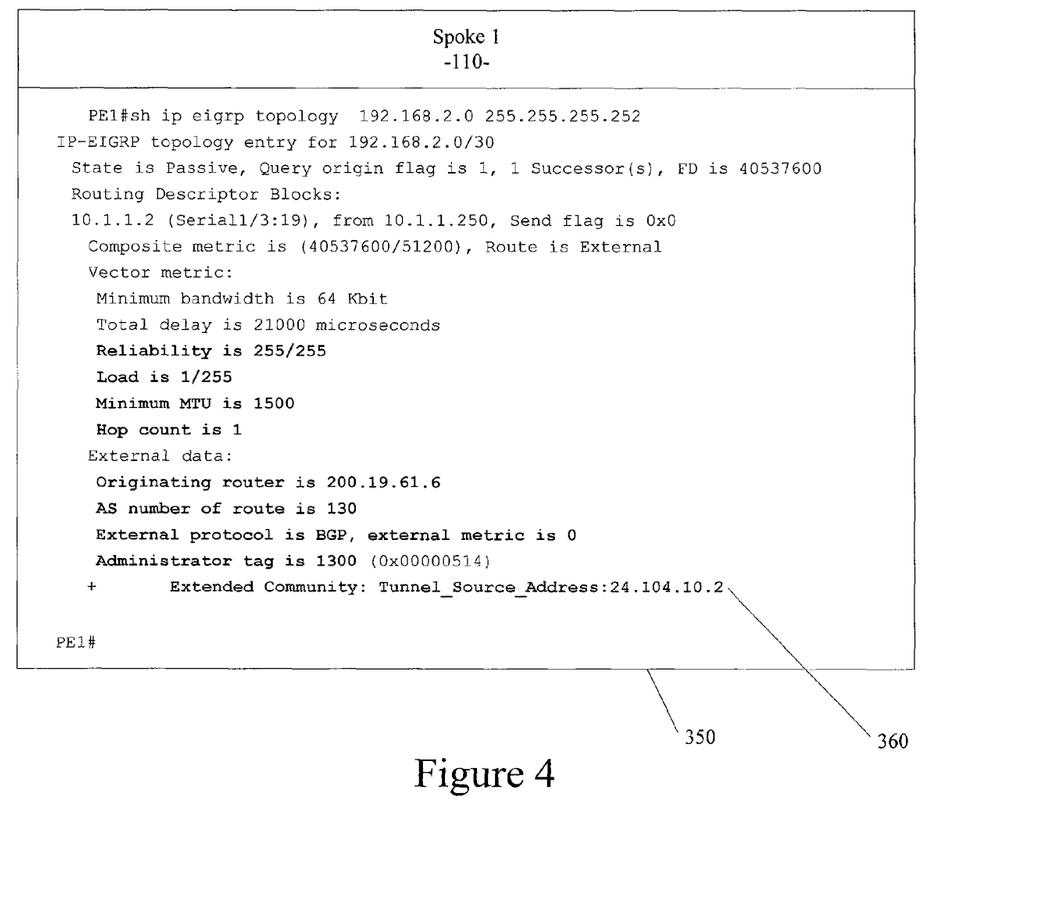
FIG. 4 illustrates an example embodiment of the Enhanced Interior Gateway Routing Protocol (EIGRP) command output including an example forwarding entry.

Referring to FIG. 4, an example embodiment of the EIGRP command output 350, including an example forwarding entry 360, is illustrated. In this example, the PE-spoke-1 uses the forwarding entry 360 to learn an IP route advertised by PE-spoke-2, whose tunnel address is 10.1.1.2 and whose tunnel-source-address is 24.104.10.2 (see forwarding entry 360).

Thus, an improved DMVPN framework without the use of NHRP is disclosed. The functionality previously provided by NHRP is incorporated into an existing routing protocol such as EIGRP or BGP as described above. It will be apparent to those of ordinary skill in the art that other conventional routing protocols can be similarly used with the techniques described herein.

Figure 5:
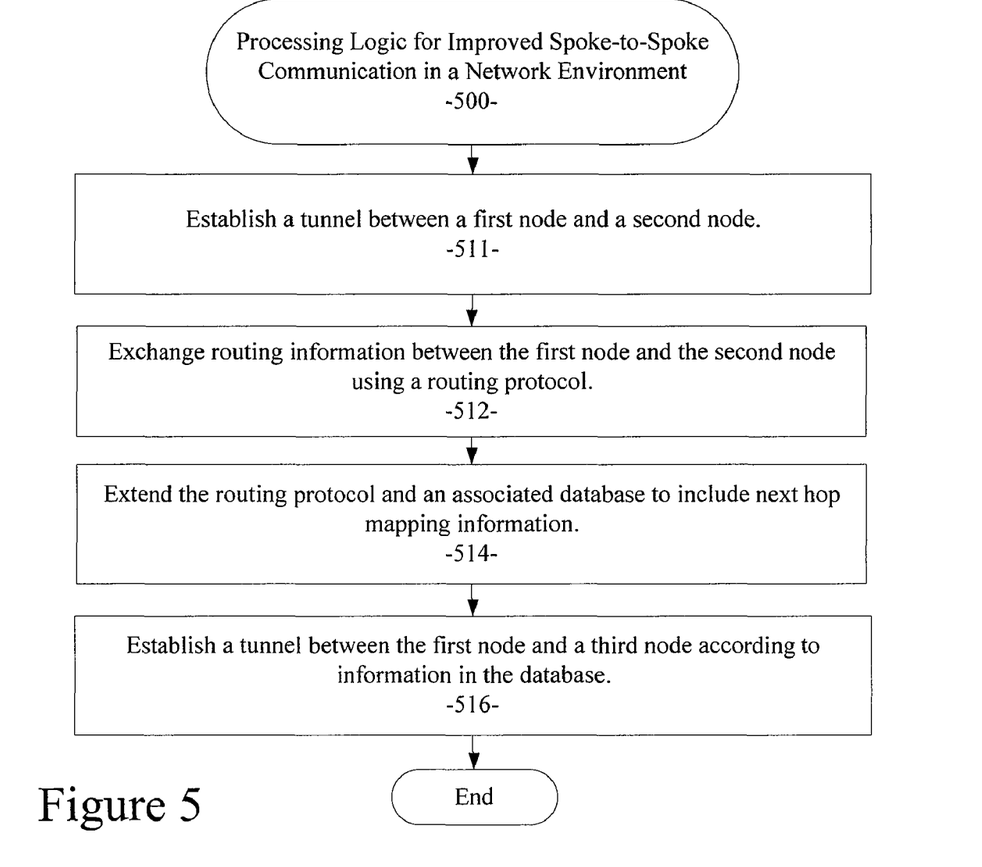
FIG. 5 is a processing flow diagram that illustrates the processing flow in accordance with one example embodiment of the disclosed subject matter.

Referring now to FIG. 5, a processing flow diagram illustrates the processing flow in accordance with one example embodiment of the disclosed subject matter. As shown, the example embodiment is configured to establish a tunnel between a first node and a second node (processing block 511). The example embodiment is configured to exchange routing information between the first node and the second node using a routing protocol (processing block 512). The example embodiment is configured to extend the routing protocol and an associated database to include next hop mapping information (processing block 514). The example embodiment is further configured to establish a tunnel between the first node and a third node according to information in the database (processing block 516).

In general, a GRE/IPSec tunnel can be established between a spoke and a hub. Next, a routing session is established between the spoke and the hub. Prefix reachability information along with the next hop mapping information is advertised by the spoke to the hub, and then by the hub to each remote spoke. Finally, a GRE/IPSec tunnel is established between spokes if a spoke needs to forward traffic towards another spoke.

Figure 6:
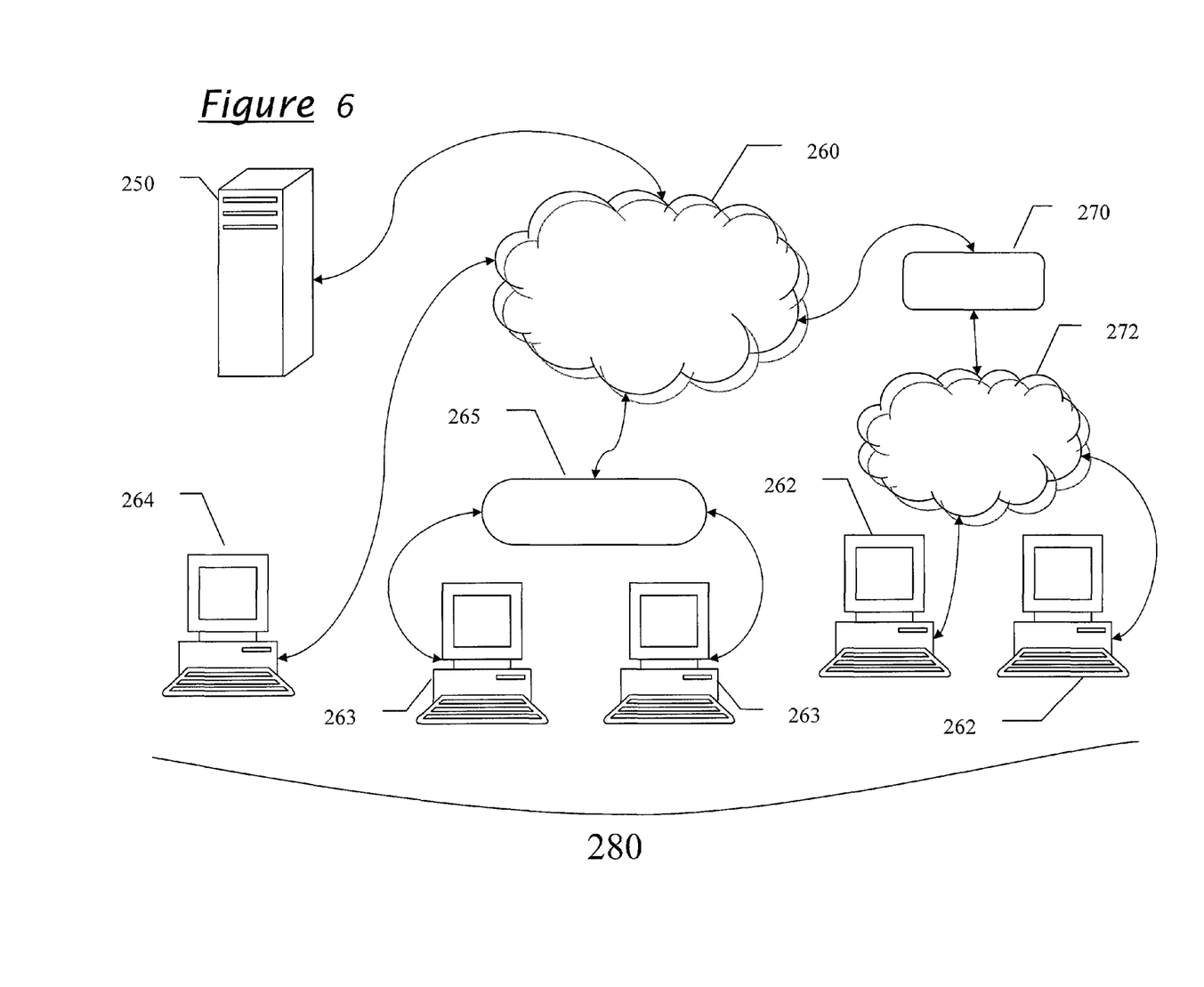
FIG. 6 illustrates a network environment in which an example embodiment may operate.

Referring now to FIG. 6, a diagram illustrates the network environment in which an example embodiment may operate.

In this network architecture, a server computer system 250 is coupled to a wide-area network 260. Wide-area network 260 includes the Internet, or other proprietary networks, which are well known to those of ordinary skill in the art. Wide-area network 260 may include conventional network backbones, long-haul telephone lines, Internet service providers, various levels of network routers, and other conventional means for routing data between computers. Using conventional network protocols, server computer system 250 may communicate through wide-area network 260 to a plurality of client computer systems 262, 263, and 264 connected through wide-area network 260 in various ways. For example, client 264 is connected directly to wide-area network 260 through direct or dial-up telephone or other network transmission line. Alternatively, clients 263 may be connected through wide-area network 260 using a modem pool 265 A conventional modem pool 265 allows a plurality of client systems to connect with a smaller set of modems in modem pool 265 for connection through wide-area network 260. In another alternative network topology, wide-area network 260 is connected to a gateway computer 270. Gateway computer 270 is used to route data to clients 262 through a subnet and LAN 272. In this manner, clients 262 can communicate with each other through local area network 272 or with server computer system 250 through gateway 270 and wide-area network 260.

Using one of a variety of network connection means, server computer system 250 can communicate with client computers 280 using conventional means. In a particular implementation of this network configuration, a server computer system 250 may operate as a web server if the Internet's World-Wide Web (WWW) is used for wide area network 260. Using the hypertext transport protocol (HTTP) and the hypertext mark-up language (HTML) across wide-area network 260, server computer system 250 may communicate across the WWW with clients 280. In this configuration, client computers 280 use a client application program known as a web browser, such as Internet Explorer™ published by Microsoft Corporation of Redmond, Wash., the user interface of America On-Line™, or the web browser or HTML renderer of any other supplier. Using such conventional browsers and the WWW, clients 280 may access image, graphical, and textual data provided by server computer system 250 or they may run Web application software. Conventional means exist by which clients 280 may supply information to server computer system 250 through the wide-area network 260 and the server computer system 250 may return processed data to clients 280.

Figures 7, 8:
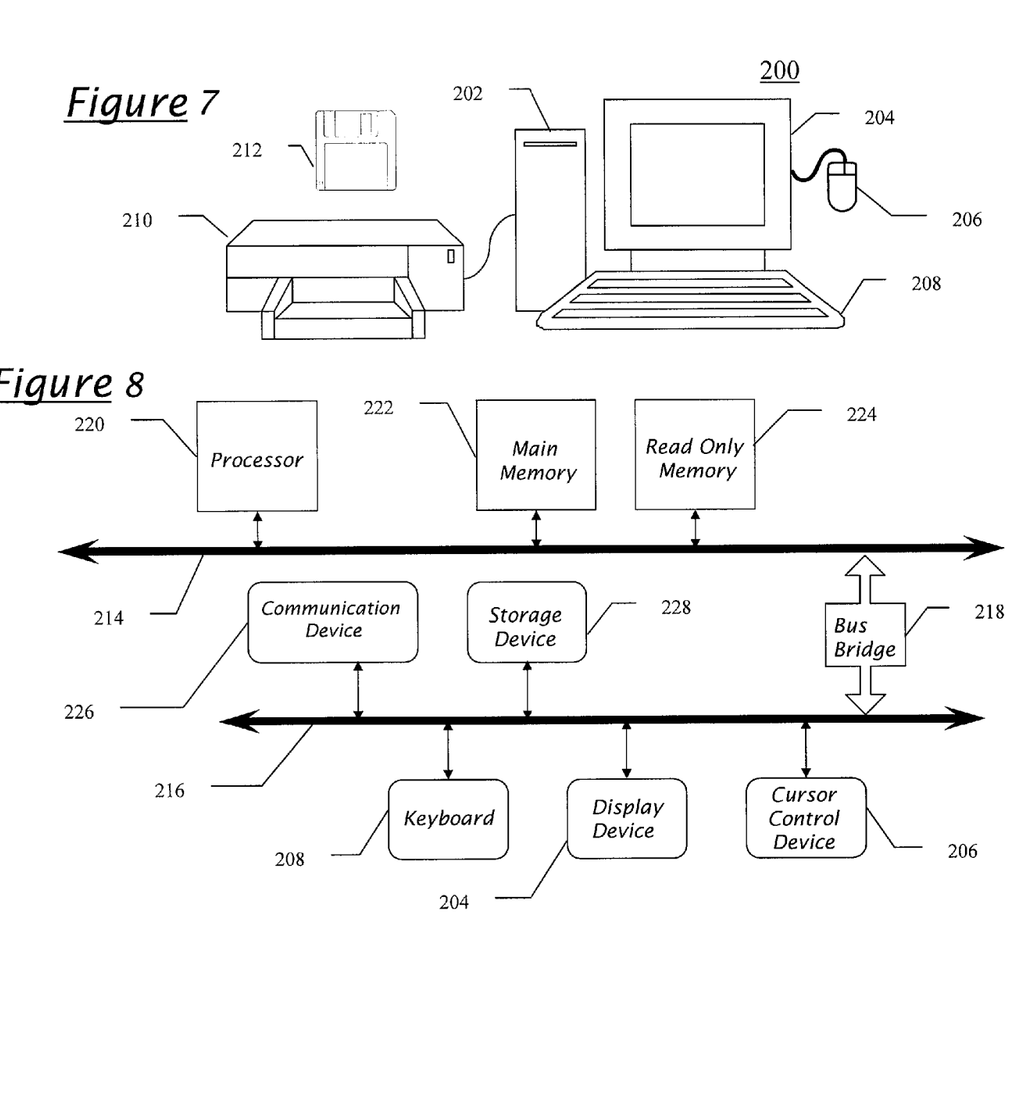
FIGS. 7 and 8 show an exemplary computer system in which the features of an example embodiment may be implemented.

Having briefly described one embodiment of the network environment in which an example embodiment may operate, FIGS. 7 and 8 show an example of a computer system 200 illustrating an exemplary client computer 280 or server computer system 250, in which the features of an example embodiment may be implemented. Computer system 200 is comprised of a bus or other communications means 214 and 216 for communicating information, and a processing means such as processor 220 coupled with bus 214 for processing information. Computer system 200 further comprises a random access memory (RAM) or other dynamic storage device 222 (commonly referred to as main memory), coupled to bus 214 for storing information and instructions to be executed by processor 220. Main memory 222 may also be used for storing temporary variables or other intermediate information during execution of instructions by processor 220. Computer system 200 also comprises a read only memory (ROM) and/or other static storage device 224 coupled to bus 214 for storing static information and instructions for processor 220. Computer system 200 may also include a machine-readable medium 212, such as a magnetic or optical disk, on which data and processor instructions may to stored and retrieved by processor 220.

An optional data storage device 228 such as a magnetic disk or optical disk and its corresponding drive may also be coupled to computer system 200 for storing information and instructions. Computer system 200 can also be coupled via bus 216 to a display device 204, such as a cathode ray tube (CRT) or a liquid crystal display (LCD), for displaying information to a computer user. For example, image, textual, video, or graphical depictions of information may be presented to the user on display device 204. Typically, an alphanumeric input device 208 (e.g. a keyboard), including alpha-numeric and other keys, is coupled to bus 216 for communicating information and/or command selections to processor 220. Another type of user input device is cursor control device 206, such as a conventional mouse, trackball, or other type of cursor direction keys for communicating direction information and command selection to processor 220 and for controlling cursor movement on display device 204.

Alternatively, the client 280 can be implemented as a network computer or thin client device. Client 280 may also be a laptop or palm-top computing device, such as the Palm Pilot™. Client 280 could also be implemented in a robust cellular telephone, where such devices are currently being used with Internet micro-browsers. Such a network computer or thin client device does not necessarily include all of the devices and features of the above-described exemplary computer system; however, the functionality of an example embodiment or a subset thereof may nevertheless be implemented with such devices.

A communication device 226 is also coupled to bus 216 for accessing remote computers or servers, such as server computer system 250, or other servers via the Internet, for example. The communication device 226 may include a modem, a network interface card, or other well-known interface devices, such as those used for interfacing with Ethernet, Token-ring, or other types of networks. In any event, in this manner, the computer system 200 may be coupled to a number of server computer systems 250 via a conventional network infrastructure such as the infrastructure illustrated in FIG. 6 and described above.

The system of an example embodiment includes software, information processing hardware, and various processing steps, which are described above. The features and process steps of example embodiments may be embodied in machine or computer-executable instructions. The instructions can be used to cause a general purpose or special purpose processor, which is programmed with the instructions, to perform the steps of an example embodiment. Alternatively, the features or steps may be performed by specific hardware components that contain hard-wired logic for performing the steps, or by any combination of programmed computer components and custom hardware components. While embodiments are described with reference to the Internet, the method and apparatus described herein is equally applicable to other network infrastructures or other data communications systems.

The use of particular embodiments with various types and formats of data structures may be described. It will be apparent to those of ordinary skill in the art that alternative embodiments of the implementations described herein can be employed and still fall within the scope of the claimed embodiments. In the detail herein, various embodiments are described as being implemented in computer-implemented processing logic denoted sometimes herein as the "software." As described above, however, the claimed embodiments are not limited to a purely software implementation.

The software and/or data described herein may further be transmitted or received over a wide-area network 260 via the communication device 226 utilizing any one of a number of well-known transfer protocols, for example, HTTP. While the machine-readable medium 212 is shown in an example embodiment to be a single medium, the term "machine-readable medium" should be taken to include a single medium or multiple media (e.g., a centralized or distributed database, and/or associated caches and servers) that store data and one or more sets of instructions. The term "machine-readable medium" shall also be taken to include any medium that is capable of storing, encoding, or carrying a set of instructions for execution by the machine and that cause the machine to perform any one or more of the methodologies of the disclosed subject matter, or that is capable of storing, encoding, or carrying data structures utilized by or associated with such a set of instructions. The term "machine-readable medium" shall accordingly be taken to include, but not be limited to, solid-state memories, optical and magnetic media, and carrier wave signals.

Although the present specification describes components and functions implemented in the embodiments with reference to particular standards and protocols, the disclosed subject matter may not be limited to such standards and protocols. Each of the standards for Internet and other packet switched network transmission (e.g., transmission control protocol/Internet protocol (TCP/IP), user datagram protocol/Internet protocol (UDP/IP), HTML, and HTTP) represent examples of the state of the art. Such standards are periodically superseded by faster or more efficient equivalents having essentially the same functions. Accordingly, replacement standards and protocols having the same functions are considered equivalents.

Thus, as described above, systems and methods for using routing protocol extensions to improve spoke to spoke communication in a computer network are disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

We claim:

1. A method comprising:
    establishing a tunnel between a first node and a second node using a dynamic multipoint virtual private network (DMVPN) framework;
    exchanging routing information between the first node and the second node using a routing protocol;
    extending the routing protocol and an associated database to include next hop mapping information in a dynamic multipoint virtual private network (DMVPN) framework without the use of next hop resolution protocol (NHRP), wherein the next hop mapping information is included in a routing protocol message even if the routing protocol message does not carry any prefix reachability information; and
    establishing a tunnel between the first node and a third node according to information in the database without the use of next hop resolution protocol (NHRP).

2. The method as claimed in claim 1 wherein the routing protocol is Border Gateway Protocol (BGP).

3. The method as claimed in claim 1 wherein the routing protocol is Enhanced Interior Gateway Routing Protocol (EIGRP).

4. The method as claimed in claim 1 wherein the next hop mapping information includes a mapping of at least one pair of IP addresses.

5. The method as claimed in claim 4 wherein the pair of IP addresses includes the IP address configured as a tunnel IP address.

6. The method as claimed in claim 4 wherein the pair of IP addresses includes the IP address configured as a tunnel source IP address.

7. The method as claimed in claim 1 wherein the next hop mapping information is stored in the database.

8. The method as claimed in claim 1 wherein a change in an IP address associated with the next hop mapping information produces a dynamic routing protocol update from a spoke to a hub and then to other spokes.

9. An apparatus comprising:
    a first node, having a processor, to establish a tunnel between the first node and a second node using a dynamic multipoint virtual private network (DMVPN) framework, the first node, using the processor, to exchange routing information with the second node using a routing protocol;
    means for extending the routing protocol and an associated database to include next hop mapping information in a dynamic multipoint virtual private network (DMVPN) framework without the use of next hop resolution protocol (NHRP), wherein the next hop mapping information is included in a routing protocol message even if the routing protocol message does not carry any prefix reachability information; and
    the first node to establish a tunnel between the first node and a third node according to information in the database without the use of next hop resolution protocol (NHRP).

10. The apparatus as claimed in claim 9 wherein the routing protocol is Border Gateway Protocol (BGP).

11. The apparatus as claimed in claim 9 wherein the routing protocol is Enhanced Interior Gateway Routing Protocol (EIGRP).

12. A hub apparatus comprising:
    a memory device;
    a first spoke interface to receive a routing protocol message from a spoke, the routing protocol message being extended to include next hop mapping information for a first spoke in a dynamic multipoint virtual private network (DMVPN) framework, wherein the next hop mapping information is included in a routing protocol message even if the routing protocol message does not carry any prefix reachability information, the routing protocol message not using next hop resolution protocol (NHRP), the next hop mapping information including at least one tunnel address of a tunnel established between the first spoke and another spoke, the tunnel being established using a dynamic multipoint virtual private network (DMVPN) framework;
    a hub database to store the next hop mapping information for the first spoke in the memory device; and
    a second spoke interface to advertise the next hop mapping information for the first spoke to a second spoke via a routing protocol.

13. The hub apparatus as claimed in claim 12 wherein the routing protocol is Border Gateway Protocol (BGP).

14. The hub apparatus as claimed in claim 12 wherein the routing protocol is Enhanced Interior Gateway Routing Protocol (EIGRP).

* * * * *